Figure 1:
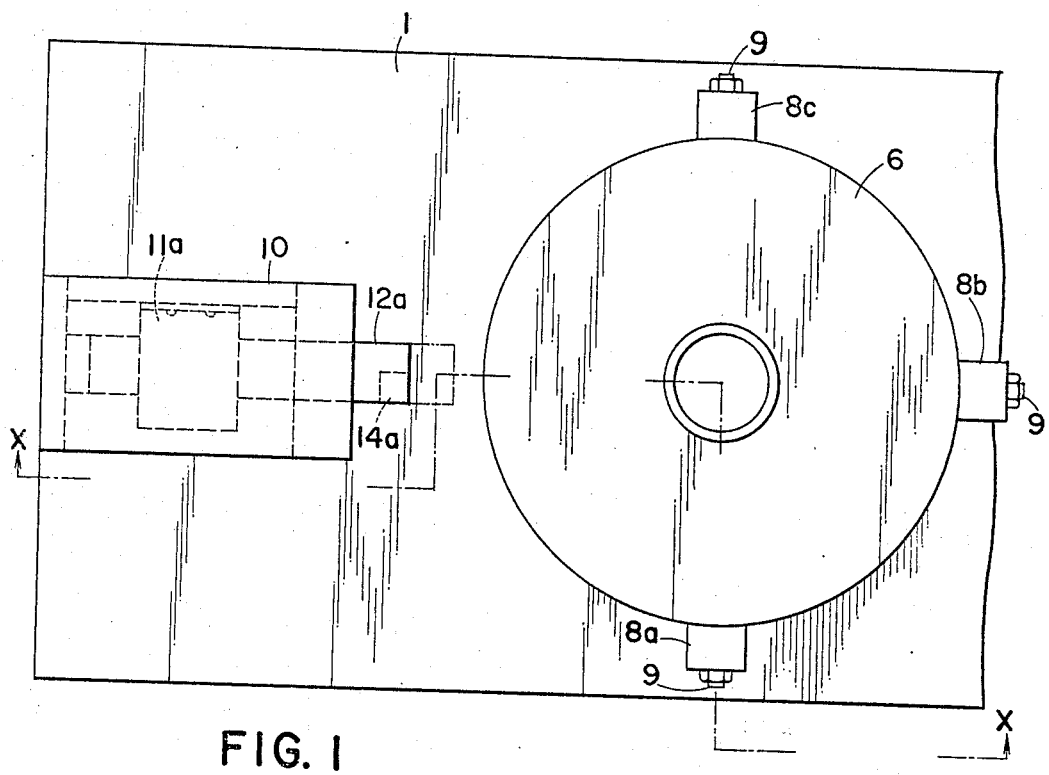

United States Patent [19]

Nishimura et al.

[11] 3,801,801

[45] Apr. 2, 1974

[54] APPARATUS FOR CONTROLLING THE ANGLE OF ROTATION OF A ROTARY MEMBER

[75] Inventors: Matsuo Nishimura, Tokyo; Tozaburo Tsujimura, Yokohama, both of Japan

[73] Assignee: Yasui Sangyo Company Limited, Fujinomuja-shi, Shizuoka-ken, Japan

[22] Filed: Mar. 5, 1973

[21] Appl. No.: 337,945

[52] U.S. Cl............................. 307/149, 200/61.39
[51] Int. Cl............................................. H02j
[58] Field of Search................ 307/149; 200/61.39

[56] References Cited
UNITED STATES PATENTS
3,450,850  6/1969  Raschke......................... 200/61.39

Primary Examiner—L. T. Hix

[57] ABSTRACT

An apparatus for controlling the angle of rotation of a rotary member is adapted to be rotated by a drive mechanism. The apparatus includes a plurality of axially spaced circumferential grooves in the peripheral outer surface of the rotary member. A plurality of stops are mounted on the rotary member in such a manner that each stop is movable along one of the circumferential grooves and can be temporarily fixed at a selected point along the groove. A plurality of vertically aligned solenoids are disposed adjacent a segment of the rotary member and have their movable parts directed toward the circumferential grooves in the rotary member. Each solenoid is adapted to be energized to cause its movable part to protrude into the path of rotary movement of the associated stop on the rotary member. A limit switch is provided on the free end of each movable part so that the switch is operable in response to engagement by one of the stops to shut off the power supply to the drive mechanism to thereby discontinue the rotation of the rotary at the selected point.

1 Claim, 2 Drawing Figures

APPARATUS FOR CONTROLLING THE ANGLE OF ROTATION OF A ROTARY MEMBER

The present invention relates to an apparatus for controlling the angle of rotation of a rotary member. The invention is suitable for, though not restrictively, the controlling of angular motion of an arm of a manipulator.

According to the present invention, there is provided an apparatus for controlling the angle of rotation of a rotary member adapted to be rotated by a drive mechanism, said apparatus including a plurality of axially spaced circumferential grooves in the peripheral outer surface of said rotary member, a plurality of stops mounted on said rotary member in such a manner that each stop is movable along one of said circumferential grooves and can be temporarily fixed at a solenoid point along the groove, a stationary solenoid support upstanding adjacent a segment of said outer peripheral surface of said rotary member, a plurality of solenoids on said solenoid support each having a movable part directed toward one of said circumferential grooves in said rotary member, each of said solenoids being adapted to be energized to cause its movable member to protrude into the path of rotary movement of the associated stop on said rotary member, and a limit switch on the free end of each of said movable parts operable in response to engagement by one of said stops to shut off the power supply to said drive mechanism.

The power supplied to the drive mechanism may preferably be in the form of a fluid pressure such as hydraulic pressure. The stops may advantageously be temporarily fixed at a selected point along the associated circumferential groove in the rotary member by means of screws.

The above and other objects, features and advantages of the present invention will be made apparent by the following description with reference to the accompanying drawings.

Figure 2:
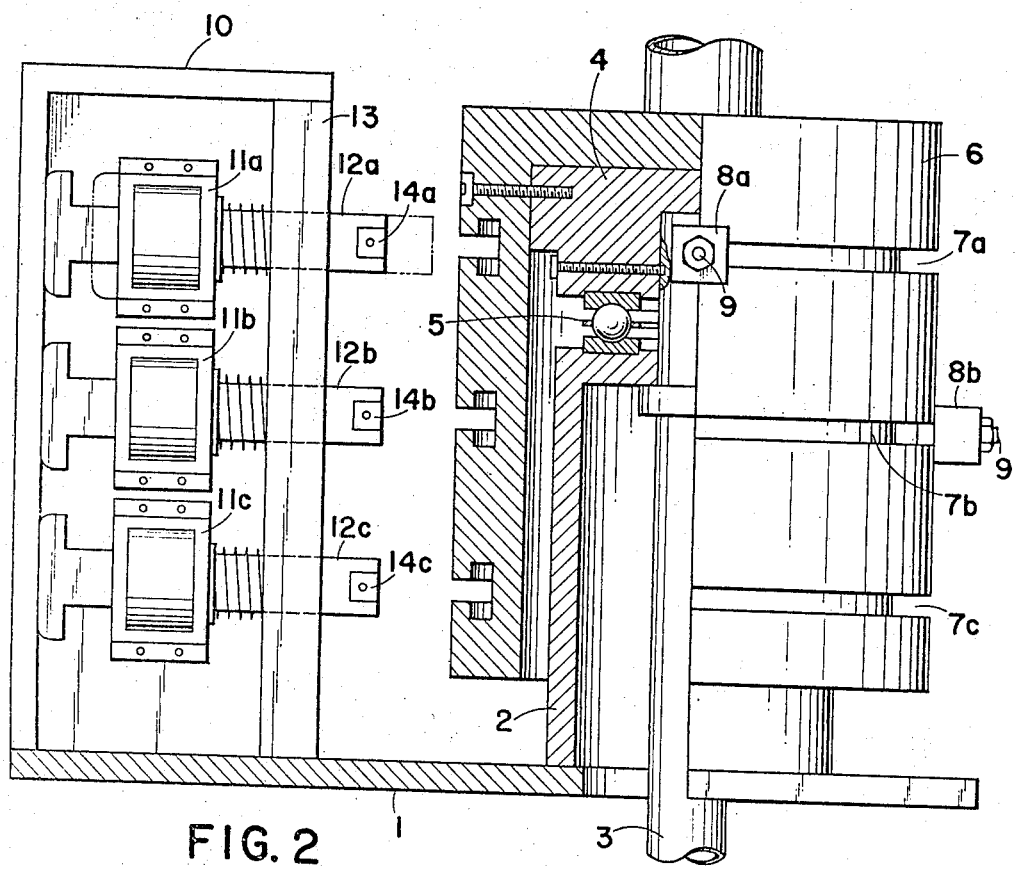

In the drawings:

FIG. 1 is a plan view of an embodiment of the apparatus according to the present invention; and FIG. 2 is a sectional side elevation of the apparatus taken along line X—X in FIG. 1.

Reference numeral 1 denotes a base having a bearing member 2 mounted on a desired portion thereof and extending upwardly therefrom. The bearing member 2 is in the form of a cylinder having a closed top end. A vertical shaft 3 extends rotatably through the base 1 and the top of the bearing member 2. The vertical shaft 3 has a flange 4 of an increased diameter rigidly fixed to the top of the shaft. A thrust bearing 5 bears against the top surface of the bearing member 2 and against the bottom surface of the flange 4.

A rotary member 6 which is in the form of a cylinder having a closed top, is snugly received on and fixed to the flange 4 of the shaft 3. The rotary member 6 is formed with a plurality of axially spaced circumferential grooves 7a, 7b and 7c in the peripheral outer surface thereof. Stops 8a, 8b and 8c are mounted on the outer peripheral surface of the rotary member so that the stops are movable along respective grooves 7a, 7b and 7c and can be fixed at selected points and the grooves by means of screws 9.

The base 1 also has a solenoid support 10 mounted thereon and upstanding by one side of the rotary member 6. The solenoid support 10 carries a plurality of laterally directed solenoids 11a, 11b and 11c mounted thereon at substantially the same levels as those of the circumferential grooves 7a, 7b and 7c in the rotary member 6. The solenoids 11a, 11b and 11c have movable parts 12a, 12b and 12c, respectively.

The movable parts extend slidably through lateral through-holes in a vertical supports 13 provided in the solenoid support 10 and have free ends projecting toward respective circumferential grooves 7a, 7b and 7c.

The movable parts 12a, 12b and 12c of the solenoids 11a, 11b and 11c respectively carry at their free ends limit switches 14a, 14b and 14c which are operable by engagement by the stops 8a, 8b and 8c on the rotary member 6 to shut off the power supply to the drive means (not shown) for the vertical rotary shaft 3.

The solenoids 11a, 11b and 11c are adapted to be selectively excited by manual operation of respective associated switches, not shown, for causing their movable parts 12a, 12b and 12c to protrude laterally into the circular paths of rotary movements of the stops 8a, 8b and 8c on the rotary member 6, respectively, so that the stops are moved into engagement with the side faces of the free ends of the movable parts 12a, 12b and 12c of the solenoids 11a, 11b and 11c to actuate the limit switches 14a, 14b and 14c, respectively.

It will be appreciated that the angle of rotation of the rotary member 6, which is caused by the rotation of the rotary shaft 3, can be controlled as desired.

For example, it is desired to cause the rotary member 6 to have three steps of rotary motions through 270°, 90° at each step, the stop 8a in the first circumferential groove 7a in the rotary member 6 will be temporarily fixed at the point along the groove 7a which is angularly spaced 90° from a reference point positioned in opposite relationship with the solenoid 11a. Then, the stop 8b in the second circumferential groove 7b will be temporarily fixed at the point along the groove 7b which is angularly spaced 90° from the temporary position of the stop 8a. The stop 8c in the third circumferential groove 7c will then be temporarily fixed at the point along the groove 7c which is angularly spaced 90° from the temporary position of the stop 8b. The first, second and third solenoids 11a, 11b and 11c will be energized by manual switching operation so that the movable parts 12a, 12b and 12c of the respective solenoids are caused to protrude therefrom into the paths of rotary movements of the stops 8a, 8b and 8c, respectively.

The drive mechanism, not shown, will then be operated to rotate the vertical shaft 3. The rotary member 6 will be also rotated with the shaft 3 until the first stop 8a is moved into engagement with the side face of the free end portion of the movable part 12a of the solenoid 11a to actuate the limit switch 14a so that the power supply to the drive mechanism is shut off. Thus, it will be noted that the rotary member has been rotated. 90°.

Then, the solenoid 11a will be deenergized to retract the movable part 12a. The drive mechanism will then be operated to again rotate the shaft 3 together with the rotary member 6 until the second stop 8b on the rotary member 6 engages the side face of the free end of the movable part 12a of the solenoid 11b to actuate the associated limit switch 14b so that the power supply to the drive mechanism is shut off to discontinue the rotation of the shaft 3 and thus the rotary member 6. Thus, the latter has been rotated 180° from its initial position.

The second solenoid 11b will then be deenergized to retract its movable part 12b. Thereafter, the drive mechanism will be again operated to rotate the shaft 3 together with the rotary member 6. When the latter is further rotated 90°, the third stop 8c on the rotary member 6 will engages the side face of the free end of the movable part 12c of the solenoid 11c to actuate the associated limit switch 14c so that the power supply is shut off with a result that the rotation of the rotary member 6 is discontinued with the third stop 8c engaging the movable part 12c of the third solenoid 11c.

Thus, it will be noted that the rotary member 6 has had three steps of rotary motions, 90° at each step, i.e., 270° in total.

Preferably, the rotary shaft 3 is driven by means of a fluid pressure such as hydraulic pressure. The limit switches referred to above are preferably designed to operate to close a valve (not shown) in a pipe line (not shown) for feeding the fluid pressure therethrough. This feature of the invention is particularly advantageous in that the rotation of the rotary shaft 3 is smoothly discontinued without any interference when the stops on the rotary member 6 are stopped by engagement thereof with the free end portions of the respective solenoids.

What is claimed is:

1. An apparatus for controlling the angle of rotation of a rotary member adapted to be rotated by a drive mechanism, said apparatus including: the peripheral outer surface of said rotary member having a plurality of axially spaced circumferential grooves, a stop mounted in the grooves on said rotary member, adjustment means for each stop to move the same along one of said circumferential grooves, keeper means to fix each stop at a selected point along one of the grooves, an upstanding stationary solenoid support adjacent said outer peripheral surface of said rotary member, a plurality of spaced solenoids on said solenoid support each solenoid having a movable part at a height to register with one of the said circumferential grooves in said rotary member, means to energize each of said solenoids effective to cause its associated movable part to extend into the path of rotary movement of the stop in the groove on said rotary member with respect to which it is in registry, and a limit switch on the free end of each said movable parts operable in response to engagement by one of said stops to shut off the power supply to said drive mechanism.

* * * * *